United States Patent Office 3,541,274
Patented Nov. 17, 1970

3,541,274
POLYESTER CINE FILM SPLICING COMPOSITION CONTAINING A POLYESTERURETHANE, A HYDROGEN - BONDING SOLVENT AND AN ORGANIC SOLVENT
Alex Wasy D'Cruz, Somerset, N.J., assignor to E. I. du Pont de Nemours and Company, Wilmington, Del., a corporation of Delaware
No Drawing. Continuation-in-part of application Ser. No. 541,982, Apr. 12, 1966. This application July 3, 1968, Ser. No. 742,195
Int. Cl. C08g 22/00
U.S. Cl. 260—30.4
3 Claims

ABSTRACT OF THE DISCLOSURE

A liquid polyester cine film splicing composition comprising

[1] a polyesterurethane obtained by heating a mixture of (a) 1 mole of a linear hydroxyl-terminated polyester of a glycol of the formula HO—$(CH_2)_n$—OH, when $n$ is 4–10 carbons, and a dicarboxylic acid of the formula HOOC—R—COOH where R is alkylene of 3–8 carbons, average molecular weight of 600–1200 and acid number less than 10, and (b) about 1.1–3.1 moles of a diphenyldiisocyanate in the presence of (c) about 0.2–2.1 moles of a glycol of the foregoing formula.

[2] at least one hydrogen bonding fluorine-containing organic solvent liquid at 20° C.,

[3] a plasticizer having a boiling point above 100° C., e.g., a dialkyl phthalate or a triaryl phosphate, and

[4] a volatile organic solvent, liquid at atmospheric pressure.

---

This application is a continuation-in-part of my copending application Ser. No. 541,982, filed Apr. 12, 1966, for Adhesive Composition (now abandoned).

This invention pertains to novel adhesive compositions and to methods and articles utilizing them.

The splicing of motion picture films having a cellulose derivative base with film cements has utilized solvent action for a strong splice.

The conventional solvent cements are not useful with polyester photographic film base, e.g., biaxially oriented ethylene glycol/terephthalic acid polyester. The polyesters, because of their chemical inertness, are not attacked by common solvents suitable for making splicing cements. In addition, when a solvent does attack or diffuse into the surface of the polyester film base, it usually becomes brittle and the splice breaks easily.

The novel viscous liquid adhesive compositions of this invention contain as essential ingredients:

[1] an essentially linear polyesterurethane characterized by being a thermoplastic elastomer, substantially free of crosslinks. It can be readily extruded in the molten state. The polyesterurethane is the reaction product obtained by heating a mixture of (a) one mole of linear hydroxyl-terminated polyester of a glycol of the formula HO—$(CH_2)_n$—OH, where $n$ is 4 to 10 carbon atoms and a dicarboxylic acid of the formula HOOC—R—COOH where R is an alkylene radical from 3 to 8 carbon atoms, said polyester having an average molecular weight between 600 and 1200 and an acid number less than 10, and (b) about 1.1 to 3.1 moles of a diphenyl diisocyanate having an isocyanate group on each phenyl nucleus in the presence of (c) from about 0.1 to about 2.1 moles of a free glycol of the formula HO—$(CH_2)_n$—OH where $n$ is 4 to 10 carbon atoms.

[2] at least one hydrogen bonding fluorine-containing organic solvent liquid at normal atmospheric pressure and 20° C. selected from the group consisting of hexafluoroisopropanol, hexafluoroacetone sesquihydrate, α,α-bis-trifluoromethylbenzyl alcohol, 1,1,1-trifluoro-2-trifluoromethyl-4-pentan-2-ol and hexafluoroacetone/propylene adduct (2:1);

[3] a plasticizer having a boiling point above 100° C. selected from the group consisting of triaryl phosphates; dialkyl phthalates, adipates, azelates, and sebacates; methyl pentachlorostearate and hexafluoroacetone/biphenyl ether adduct (2:1 mole ratio); and

[4] a volatile organic solvent, liquid at normal atmospheric pressure.

Suitable glycols include 1,4-butanediol; 1,5-pentanediol, 1,6-hexanediol, 1,7-heptanediol, 1,8-octanediol and 1,10-decanediol.

Suitable saturated aliphatic dicarboxylic acids include adipic, pimelic, suberic, azelaic, and sebacic.

Suitable specific plasticizers which can be used in splicing cements of this invention include triphenyl phosphate, tricresyl phosphate, tributoxyethyl phosphate; diethyl phthalate, dibutyl phthalate, dioctyl phthalate, dioctyladipate, dioctyl sebacate, dioctyl azelate; methylpentachlorostearate and hexafluoroacetone/biphenylether adduct (2:1 mole ratio).

Suitable organic solvents include ethers, e.g., diethyl ether tetrahydrofuran, and 1,4-dioxane; esters, e.g., methyl acetate, methyl formate, ethyl acetate and ethyl formate; ketones, e.g., methyl ethyl ketone and cyclohexanone; halogenated hydrocarbons, e.g., methylene chloride, chloroform, trichlorotrifluoroethane, and nitroalkanes, e.g., mononitromethane and mononitroethane.

Suitable polyisocyanate or polyisothiocyanates which can be used in accordance with this invention include each of the specific compounds listed in col. 5, lines 9–41 of Saner U.S. Pat. 2,698,241, Dec. 28, 1954.

Useful filler materials which can be admixed with the novel adhesive composition of this invention include silica, magnesium oxide, magnesium silicate, calcium silicate, zinc oxide, lead oxide, barium sulfate, chalk, mica, carbon black, protein metal and clay. These fillers have particle sizes of average diameter from 5 to 25 millimicrons.

In making a splice or other lamination of two overlapping films using the adhesives of this invention, the adhesive is placed between the two surfaces to be spliced, and the area is held under pressure, e.g., 5–7 lbs. per square inch for 10 to 15 seconds at room temperature. Curing time is reduced by heating the spliced area at a temperature within the range of 25° C. to 50° C.

The invention will be further explained, but is not intended to be limited, by the following examples:

EXAMPLE I

An adhesive composition was prepared as follows:

The polyurethane which formed the essential part of the adhesive was prepared in a 4-liter reaction vessel fitted with a spiral ribbon stirrer. The following quantities of materials were admixed in the vessel as specified:

Polytetramethylene adipate having terminal groups, 1447 g. (1.70 moles, M.W. 849, hydroxyl No. 130.4, acid No. 0.89, 1,4-butanediol 109.6 g., 1.218 moles, diphenylmethane p,p'-diisocyanate 730 g., 2.92 moles).

The polyester and the diol were melted in the vessel and stirred for 20 minutes at 5–6 mm. pressure at 110–120° C. Upon addition of diphenylmethane-p,p'-diisocyanate, the mixture was stirred for 1 minute under nitrogen atmosphere and poured into a 1-gallon \* can. The can was sealed with a friction top and placed in an oven for 3.5 hours at 140° C. The polyesterurethane was cooled and broken into small pieces and a 3-gram portion ---
\*Interior coated with paraffin wax.

was dissolved in 22 g. of hexafluoroisopropanol. The resulting solution was diluted by the addition of 60 g. methylene chloride; 14 g. hexafluoroacetone, sesquihydrate, and 1 g. of bis-hexafluoroacetone/biphenyl ether adduct (2:1 mole ratio) were added to the solution with mixing.

By substituting any of the specific ester-forming ingredients listed above or any of the isocyanates or polyisothiocyanates listed in col. 5, lines 9–41 of U.S. Pat. 2,698,241 in equivalent amounts, splicing cements similar to those in Example 1 can be prepared.

Two photographic films made as described in Alles et al., U.S. 2,698,239 and having as a film base a biaxially stretched ethylene glycol/terephthalate acid polyester and a top layer of a light-sensitive gelatino-silver iodobromide emulsion, were spliced together in the following manner. The emulsion and resin of one side of one film, and the backing and resin on a second piece of film are removed by scraping. The scraped films were positioned in a Bell and Howell splicing aid, Model 1635, the adhesive composition described supra, was brushed on the scraped parts of the two films, and the two film strips were brought together. The splice was prepared so that the film strips overlapped along their whole length but adhesive was applied only at one end with 0.072-inch overlap, allowing for a full hole splice. A uniform pressure of 140 p.s.i. was maintained, and the spliced area was heated by means of heating bars to a temperature of 35° C. to 40° C. The dwell time was 15 seconds. After cooling, the spliced film was ready for use after 1 hour. However, the maximum splicing strength was obtained after 8 hours.

Peel strength tests were performed to determine the load value that would cause the film to break at the splice. The test values were determined using the Instron tensile testing machine manufactured by the Instron Engineering Corporation of Quincy, Mass., according to test procedures reported in Tran. ASME, 71, 789–96, October 1949.

Tensile strength tests were performed in a manner similar to peel strength tests, except the splice was prepared so that the film strips overlapped only at the splice. The following were obtained:

| Aging time (hours) | Peel strength, 75° F. (grams) Example I films | Peel strength, 75° F. (grams) Control [1] | Tensile strength, 75° F. (lbs.) Example I films | Tensile strength, 75° F. (lbs.) Control [1] |
| --- | --- | --- | --- | --- |
| 0 | 500 | 1,500 | 20 | 60 |
| 5 | [2] 1,000 | | 32 | |
| 10 | | | 52 | |
| 15 | 1,500 | 1,800 | 68 | |
| 20 | | | 72 | 72 |
| 25 | 1,700 | | | |
| 30 | | | | |
| 35 | | | 76 | 72 |
| 40 | | | | |
| 45 | 2,000 | 2,000 | | |
| 50 | | | 76 | |

[1] Full hole splices made with cellulose triacetate films using a conventional splicing cement and conventional methods.
[2] 2½ hours.

Creep resistance tests were also performed. A constant 1000 g. tensile load was applied to a spliced strip in an oven at 112° F. for 18 hours. The strips were then tested for tensile strength and gave values of 50 to 75 lbs. which was excellent.

Twenty, seven-inch pieces of film were spliced together to form a loop. The splices were aged for 8–10 hrs. The loop was run through a projector at a speed of 90 ft./min. No breaks occured after 2500 projections.

Films were spliced together in a manner similar to that described above except that a Griswold Splicer, Model 3, manufactured by Neumade Products Corporation was used, and half-hole splices were made. Dwell time was 10 seconds. Peel strength and tensile strength test values for a half-hole splice were initially lower than the values of the full hole splice but upon aging equaled that of the full hole splice

EXAMPLE II

The adhesive composition was made in a manner similar to the composition of Example I except 18 g. hexafluoroacetone sesquihydrate and 79 g. methylene chloride were used.

The adhesive composition was used in making splices after the manner of Example I. Peel strength and tensile strength tests gave the following results:

Tensile strength: Lbs.
   Half hole splice _____ 40–56
   Full hole splice _____ 56–80

Peel strength: Grams
   Half hole splice _____ 700–1,200
   Full hole splice _____ 2,000–2,200

EXAMPLE III

The adhesive composition was made in a manner similar to the composition of Example II except 18 g. α,α'-bistrifluoromethylbenzyl alcohol was used in place of the hexafluoroacetone sesquihydrate.

The adhesive composition was used in making splices after the manner of Example I. Peel strength and tensile strength tests gave the following results:

Tensile strength: Lbs.
   Half hole splice _____ –
   Full hole splice _____ 37–60

Peel strength: Grams
   Half hole splice _____ 200–400
   Full hole splice _____ 800–1,000

EXAMPLE IV 3 g. of the polyester described in Example I of Chambers, U.S. Pat. 3,117,901 was dissolved in 18 g. hexafluoroisopropanol. The resulting solution was diluted by the addition of 79 g. methylene chloride. 4½ g. hexafluoroacetone sesquihydrate and one gram bis-hexafluoroacetone/biphenyl ether adduct (2:1) were added to the solution with mixing.

The adhesive composition was used in making splices after the manner of Example I. Peel strength and tensile strength tests gave the following results:

Tensile strength: Lbs.
   Half hole splice _____ 8–15
   Full hole splice _____ 35–47

Peel strength: Grams
   Half hole splice _____ 400–600
   Full hole splice _____ 800–1,100

EXAMPLE V

An adhesive solution was prepared as follows: 3 grams polyester based polyurethane as prepared in Example I was dissolved in 10 g. hexafluoroisopropanol and diluted with 87 g. methylene chloride. This adhesive solution was dissolved in a mixture of 60 g. dichloromonofluoromethane and 40 g. dichloromethane to give an aerosol formulation. The aerosol formulation was dispersed from a suitable container at the splice area and pressure was applied. Dwell time was 10 seconds. Peel strength was 1000–2000 g., and tensile strength was 50–75 lbs. for full hole splices made in the above manner.

The aerosol propellant may be compressed air or pressurized gas, and may be any suitable source, such as for example, an air pump or like pressure generating member or a suitable pressurized gas container. Such containers are readily available on the commercial market in the form of gas capsules of carbon dioxide or the like under pressure, in the form of bombs or the like of gas such as fluoro-chloro-alkanes, which are available under various trade names. Similarly, a suitable system may comprise a pump or generating means optionally in combination with a pressure chamber whereby fluctuations in pressure may be limited or avoided.

Following the procedure illustrated in the foregoing examples this invention can be carried out substituting for the indicated figures and ingredients other figures and ingredients within the scope of the appended claims.

A specific advantage of this invention is that it can effectively be used in splicing polyethylene terephthalate motion picture film to another motion picture film of same or different material at room temperature.

The embodiments of the invention in which an exclusive property or privilege is claimed are defined as follows:

1. A viscous liquid adhesive composition containing as essential ingredients
   (1) a polyesterurethane free of crosslinks and being the reaction product of (a) one mole of a hydroxyl-terminated polyester of a glycol of the formula $HO-(CH_2)_n-OH$ wherein $n$ is 4–10 and a dicarboxylic acid of the formula $HOOC-R-COOH$ where R is an alkylene radical from 3–8 carbon atoms, said polyester having an average molecular weight between 600 and 1200 and an acid number less than 10 and (b) about 1.1–3.1 moles of a diphenyl diisocyanate having an isocyanate radical on each phenyl group, in the presence of (c) about 0.1 to about 2.1 moles of a glycol of the formula $HO-(CH_2)_n-OH$, where $n$ is 4–10;
   (2) at least one hydrogen bonding fluorine-containing organic solvent liquid at normal atmospheric pressure at 20° C. selected from the group consisting of hexafluoroisopropanol, hexafluoroacetone sesquihydrate, α,α-bis-trifluoromethylbenzyl alcohol, 1,1,1-trifluoro-2-trifluoromethyl-4-pentane-2-ol and hexafluoroacetone propylene adduct (2:1);
   (3) a plasticizer having a boiling point above 100° C. selected from the group consisting of triaryl phosphates; dialkyl phthalates, adipates, azelates, and sebacates; methyl pentachlorostearate and hexafluoroacetone biphenyl ether adduct (2:1 mole ratio); and
   (4) a volatile organic solvent, liquid at normal atmospheric pressure and being selected from the group consisting of diethyl ether, tetrahydrofuran; 1,4-dioxane; methyl formate, methyl acetate, ethyl formate, ethyl acetate; methyl ethyl ketone; cyclohexanone; methylene chloride, chloroform, trichlorotrifluoroethane; mononitromethane and mononitroethane, in an amount sufficient to form a viscous liquid.

2. An adhesive composition according to claim 1 wherein said alkanediol is 1,4-butanediol and said dicarboxylic acid is adipic acid.

3. An adhesive composition according to claim 1 wherein the organic polyisocyanate is methylene bis(4-phenylisocyanate).

References Cited
UNITED STATES PATENTS

| | | |
|---|---|---|
| 3,255,131 | 6/1966 | Ahlbrecht et al. |
| 3,358,033 | 12/1967 | Anello et al. 260—633 |
| 3,380,950 | 4/1968 | Blomeyer 260—30.6 |
| 3,437,622 | 4/1969 | Dahl. |

MORRIS LIEBMAN, Primary Examiner

H. H. FLETCHER, Assistant Examiner

U.S. Cl. X.R.

260—30.6, 31.2, 31.8, 32.8, 33.2, 33.4, 33.8, 40, 75.5, 77.5